United States Patent Office 2,787,587
Patented Apr. 2, 1957

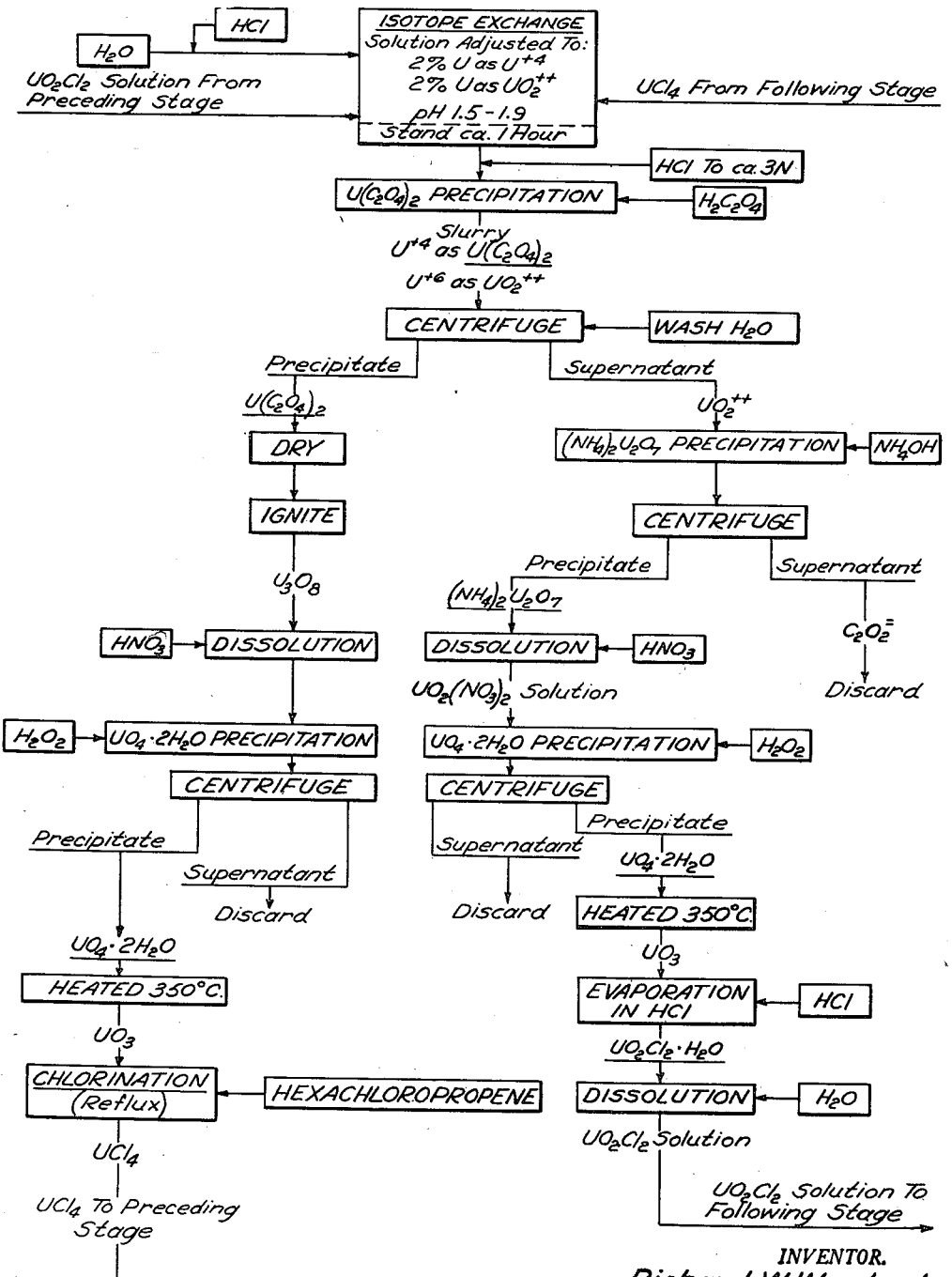

2,787,587

ISOTOPE EXCHANGE PROCESS

Richard W. Woodard, Oak Ridge, Tenn., assignor to the United States of America as represented by the United States Atomic Energy Commission Application July 26, 1949, Serial No. 106,803

15 Claims. (Cl. 204—1.5)

My invention relates to a method for changing the isotopic content of an ionic form of an element in solution, and to the utilization of this method for attaining isotopic enrichment with respect to one or more particular isotopes of the element.

It has previously been found that, in the case of certain elements, isotopic exchange can take place in solution between ions of the element in different valence states. The conditions which make such exchange possible, however, are different for different elements, and no operative conditions have thus far been found for a great many of the elements. Even when such exchange has been found to take place, it has seldom been found possible to utilize the process for effecting isotopic enrichment when starting with the naturally occurring isotopic distribution. Such enrichment has been achieved in the case of a few elements of low atomic weight, but it has generally been believed that enrichment would be practically impossible for elements of atomic weight substantially above 40.

An object of my present invention is to effect isotopic exchange between two forms of uranium of different valence states.

Another object of my invention is to provide a process for achieving isotopic exchange in solution, at a practical rate, between ionic species of uranium of different valence states.

A further object is to provide a process for isotopically enriching uranium with respect to one or more particular isotopes by means of isotopic exchange.

A still further object is to provide a semi-continuous multi-stage isotope exchange process for effecting enrichment of naturally occurring uranium with respect to one of its isotopes.

Additional objects and advantages of my invention will be apparent from the following description.

In accordance with my present invention, isotopic exchange between uranium ions is effected by contacting ions of tetravalent and hexavalent uranium in an aqueous acidic solution of carefully controlled acidity and thereafter separating the ionic species. When effecting the exchange in this manner, I have found that the equilibrium attained is not strictly a statistical distribution of the isotopic species, but that the lower valence state ion is enriched with respect to the higher atomic weight isotope, and vice versa. When three or more isotopic species are present, the highest atomic weight isotope tends to concentrate in the lower valence state and the remainder in the higher valence state. Contrary to expectations for an element of such high atomic weight, the single-stage enrichment factor thus attainable is sufficiently high to make feasible substantially complete isolation of a single isotope by multi-stage operation.

The solutions in which isotopic exchange is effected in accordance with the present invention may be aqueous solutions of any uranous and uranyl salts which are known to be stable in solution at the pH values hereinafter discussed. From the standpoints of availability, ease of preparation for recycle, and convenience in adjusting the pH of the resulting solutions, the salts of the strong mineral acids are preferred. Examples of such salts are uranyl chloride, uranous chloride, uranous oxychloride, uranyl perchlorate, uranous perchlorate, uranyl sulfate, uranous sulfate, and the like. The nitrates are undesirable due to the instability of the uranous ion in nitric acid solution. However, such properties have long been known, and one skilled in the art can readily choose suitable salts or acids for preparing solutions of adequate stability for the present process. The solutions employed, whether prepared by dissolving salts in water, by dissolving oxides in acid, by partially oxidizing uranous solutions, by partially reducing uranyl solutions, or by other equivalent processes, may all be termed acid solutions of uranous and uranyl ions and will be referred to as such in the appended claims.

I have found that control of the acidity of the solutions employed is essential for attaining practical rates of isotope exchange. Below a pH of 2, the rate constant of the exchange reaction decreases approximately linearly with pH, and at a pH substantially below 1 the rate is so slow as to be of practical utility. In fact, the exchange reaction can be practically completely stopped before equilibrium is attained by strongly acidifying the solution.

It is unnecessary, for attaining practical exchange rates, to maintain the pH of the solution above 2.0. However, in view of the linear relationship between rate constant and pH it is obvious that for optimum rate the pH should be as high as possible without encountering interfering side effects. The upper pH limit has been found to be that at which polymeric uranous ions are formed in the solution. For any particular solution, this upper limit will be dependent upon the temperature and the concentration of uranous ions in solution. At normal atmospheric temperatures and concentrations of uranous ions as low as $10^{-3}$ molar, or lower, the upper pH limit may be as high at 2.5, or even higher. However, for the preferred concentrations of uranous ions, of the order of $10^{-1}$ molar, and for moderately elevated temperatures, the upper pH limit will usually be in the neighborhood of 2.0. In any event, the upper limit for any particular solution may readily be determined by the appearance of polymeric uranous ions, with resulting changes in the absorption spectrum of the solution. Solutions containing uranyl ions and monomeric uranous ions are dark green in color. On the formation of polymeric uranous ions the solution darkens and becomes brown to almost black, depending upon the concentration. This change may be followed spectrographically, the molar extinction coefficients at 400 millimicrons being approximately 7 for the uranyl ion, approximately 0 for monomeric uranous ions, and approximately 95 for polymeric uranous ions.

Since both the isotope exchange reaction and the polymerization reaction are relatively slow under the conditions of the present process, the optimum pH will be that at which the exchange equilibrium is attained shortly before the appearance of the polymeric uranous ions. In most cases, however, it will be sufficient to maintain the pH between 1.0 and 2.0, but preferably between 1.5 and 1.9.

While the mechanism of the exchange reaction of the present invention has not been established, it has been observed that the optimum conditions for exchange correlate with the optimum conditions for the formation of hydrolyzed monomeric uranous ions in solution. Thus, the ratio of $UOH^{+3}$ to $U^{+4}$ in solutions of uranous chloride up to $10^{-2}$ molar, at about 25° C., has been found to be represented by the following equation:

$$\log \frac{[UOH^{+3}]}{[U^{+4}]} = pH - 1.52$$

Similarly, for uranous perchlorate, the equation is:

$$\log \frac{[UOH^{+3}]}{[U^{+4}]} = pH - 1.44$$

Thus, the conditions for satisfactory isotope exchange in accordance with the present invention are the presence of substantial concentrations of hydrolyzed monomeric uranous ions in solution and the absence of substantial concentrations of polymeric uranous ions.

The total concentration of uranium in the exchange solution should be as high as possible, to avoid the handling of large volumes of very dilute solutions. Solubility and polymerization considerations, however, limit the concentration of uranous ion for the present process to below about 0.5 molar. The ratio of uranyl to uranous ions is not critical, but I generally prefer to employ approximately equal concentrations of both. Suitable solutions are 0.05 to 0.5 molar with respect to both uranyl and uranous ions, but I prefer to employ solutions which are about 0.1 molar with respect to both ions.

The reaction temperature for the isotope exchange may range from normal atmospheric temperatures, or below, to the normal boiling point of the solution, or even higher if the solution is maintained under pressure. Since the use of pressure vessels is inconvenient, it is generally preferred to operate within a temperature range of about 25—75° C. High temperatures will increase the exchange reaction rate, but may adversely affect the enrichment equilibrium. For simple exchange reactions I therefore prefer to operate at elevated temperatures in order to attain a rapid reaction rate, but for enrichment purposes I prefer to operate at about 25–30° C., or even below, in order to attain a favorable enrichment factor.

The isotope exchange of the present invention is photosensitive, and the presence of light considerably accelerates the reaction. Although useful reaction rates are attainable when effecting the exchange in the dark, I prefer to carry out the reaction in the light. Any source of visible light, e. g. daylight or tungsten filament incandescent light, is suitable for this purpose. Ultraviolet light does not appear to increase the reaction rate substantially, when used in addition to visible light, but may be employed if desired.

The reaction time for attaining equilibrium in the exchange reaction will, of course, depend on the factors such as pH, temperature, and light, which affect the reaction rate. When employing the preferred reaction conditions, as discussed above, suitable reaction times are from 45 minutes to 120 minutes, with a reaction time of about one hour generally being preferred. In any event the time required to reach equilibrium in the exchange can be determined for any chosen reaction conditions by periodically sampling the solution and determining the isotopic content of the uranous uranium and of the uranyl uranium in the sample.

In carrying out a single stage exchange in accordance with the present invention the exchange solution is prepared in accordance with the above description, using sources of uranyl and uranous ions of either the same or different isotopic constitution, as desired. This solution is then maintained at the chosen pH and temperature, preferably in the light, until the exchange reaction is substantially complete. It is generally preferable at this point to acidify the solution, e. g. to about 3N., to prevent any possible adverse exchange reaction during the subsequent chemical processing. The uranyl and uranous components of the solution may then be separated by conventional methods such as selective precipitation of the uranium of one valence state, or selective extraction of the uranium of one valence state by means of organic solvents using selective chelating agents or the like. Many suitable separation processes are well known in the art, and this step of the present process is not claimed as novel herein.

In a multi-stage process, the separated uranyl uranium from the preceding stage may be used as the source of both the uranyl and uranous uranium for the succeeding enrichment stage (enrichment as to the lighter isotope); and the uranous uranium from the preceding stage may be used as the source of both the uranyl and uranous uranium for the succeeding depletion stage (depletion as to the lighter isotope). Preferably, however, a multi-stage enrichment process is carried out by a batch countercurrent procedure which does not require oxidation or reduction between stages. An example of one stage of such a process is illustrated in the flow diagram constituting the accompanying drawing, which is self-explanatory. In such a process, the exchage solution for any intermediate stage, for enriching with respect to the lighter isotope, is prepared from the uranyl uranium separated from the preceding stage and from the uranous uranium separated from the succeeding stage.

In any such multi-stage operation, the chemical processing required to convert separated uranium from one stage into suitable feed solution for an adjacent stage may be accomplished by processes well known in the art, and such conversion steps are not claimed as novel herein.

The following example illustrates the exchange of isotopes between uranyl and uranous ions of different initial isotopic constitution, utilizing the differences in radioactivity to follow the exchange reaction:

EXAMPLE I

A stock solution was prepared from almost pure $U^{238}$, in the form of $UCl_4$, in a concentration of 6.25 grams U per liter. This solution had a specific activity of 25,000 counts per minute per milliliter.

A second stock solution was prepared from uranium enhanced in $U^{234}$ and $U^{235}$, in the form of $UO_2Cl_2$, also in a concentration of 6.25 grams U per liter. This solution had a specific activity of 132,500 counts per minute per milliliter.

Systems were made up by taking 2.0 ml. of each stock solution, adding sufficient hydrochloric acid to give the desired pH, and diluting to a volume of 20.0 ml. The pH of each such exchange solution was then measured potentiometrically, and a 2.0 ml. aliquot was withdrawn to determine actual initial content of $U^{+4}$ and $U^{+6}$ (because of partial oxidation of the $U^{+4}$ stock solution on storage).

Each of the exchange solutions was maintained at 28° C., in the light, and 2.0 ml. aliquots were withdrawn periodically for analysis. The $U^{+4}$ content of each aliquot was separated by a conventional cupferron-chloroform extraction. The chloroform solution of the uranium cupferride was diluted to 10.0 ml. from which a 2.0 ml. aliquot was taken for radioactivity determination by conventional counting methods, and a second 2.0 ml. aliquot was taken for determination of the uranium content by conventional colorimetric analysis.

The exchange reaction, effected as above described, may be represented as:

$$U^*O_2^{+2} + U^{+4} \rightarrow U^{*+4} + UO_2^{+2}$$

The rate constant, $k$, for this reaction may be represented as:

$$k = \frac{l}{t(A+B)} \ln \frac{A(B+BR)}{B(A-BR)}$$

where:

$t$ = time in minutes
$A$ = micrograms U as $U^*O_2^{+2}$ at $t=0$
$B$ = micrograms U as $U^{+4}$ at $t=0$ $$R = \frac{U^{*+4}}{U^{+4}} \text{ at time} = t$$

Quantities A, B, and $t$ are all known, and R is determined by solving simultaneous equations involving the weight and radioactivity of the tetravalent uranium in the system at time=$t$.

The results of the exchange reactions carried out as described above are shown in Table 1, together with the calculated rate constant for each pH and reaction time employed.

Table 1

| pH | $t$ (min.) | A ($\gamma$) | B ($\gamma$) | c/m. of Aliquot | U in Aliquot | R | $\dfrac{A(B+BR)}{B(A-BR)}$ | $k$ | $k$ (average) |
|---|---|---|---|---|---|---|---|---|---|
| 1.1 | 0 | 312 | 188 | | | | | | |
|  | 85 | | | 263 | 165 | .08 | 1.13 | $2.9 \times 10^{-6}$ | |
|  | 218 | | | 448 | 135 | .21 | 1.39 | $3.0 \times 10^{-6}$ | $3.1 \times 10^{-6}$ |
|  | 310 | | | 537 | 118 | .33 | 1.66 | $3.3 \times 10^{-6}$ | |
| 1.3 | 0 | 350 | 150 | | | | | | |
|  | 5 | | | 139 | 150 | .04 | 1.05 | $19.6 \times 10^{-6}$ | |
|  | 16 | | | 286 | 145 | .12 | 1.18 | $20.7 \times 10^{-6}$ | $18.8 \times 10^{-6}$ |
|  | 40 | | | 488 | 138 | .27 | 1.43 | $18.0 \times 10^{-6}$ | |
|  | 100 | | | 785 | 123 | .67 | 2.33 | $17.0 \times 10^{-6}$ | |
| 1.9 | 0 | 345 | 155 | | | | | | |
|  | 4 | | | 268 | 155 | .10 | 1.15 | $69.0 \times 10^{-6}$ | |
|  | 31 | | | 1,050 | 154 | .73 | 2.60 | $62.2 \times 10^{-6}$ | $62.9 \times 10^{-6}$ |
|  | 63 | | | 1,349 | 153 | 1.35 | 6.00 | $57.6 \times 10^{-6}$ | |

NOTE.—A and B in Table 1 are actually only one-fiftieth of the amount of tetravalent and uranyl ion present in the original system. These values are employed since the activity and colorimetric determinations also represent one-fiftieth of the original system.

The exchange reaction of the above example has also been successfully effected using $U^{233}$ initially in the hexavalent state, using $U^{233}$ initially in the tetravalent state, and using $UO_2SO_4$ and $U(SO_4)_2$ in place of $UO_2Cl_2$ and $UCl_4$.

The following example illustrates the utilization of the exchange reaction of the present invention in a multistage process for the isotopic enrichment of natural uranium:

EXAMPLE II

A quantity of uranium oxide ($UO_3$) of known isotopic concentration (normal at the start of a run) was divided into two equal portions. One of these was chlorinated to $UCl_4$ with hexachloropropene, the other was prepared as $UO_2Cl_2.XH_2O$ by dissolving $UO_3$ in hydrochloric acid and evaporating to dryness on the hotplate. The two salts, $UCl_4$ and $UO_2Cl_2$, were then dissolved in a sufficient quantity of water to give a 4% uranium solution, i. e. 2% with respect to $U^{+4}$ and 2% U as $UO_2^{+2}$. The pH of the solution was checked at this point and usually it was 1.5–1.6, which is within the preferred range for exchange. Sufficient time, usually about one hour, was allowed for the system to come to equilibrium at 28–30° C. The exchange reaction was stopped at this point by the addition of a sufficient quantity of hydrochloric acid to raise the normality to 3N. A five percent excess over the theoretical amount of oxalic acid necessary to precipitate all $U^{+4}$ ion was added and the solution stirred to aid in the formation of an easily filtered uranous oxalate precipitate. The oxalate precipitate was washed several times with dilute HCl containing oxalic acid, combining these washings with the original filtrate.

The filtrate from the oxalate precipitation was utilized to prepare the feed for the next enrichment stage (enrichment with respect to $U^{235}$). This was accomplished by conventional procedures, i. e. precipitating the uranyl ion as ammonium diuranate, dissolving the precipitate in aqueous nitric acid, reprecipitating with hydrogen peroxide, and calcining the latter precipitate to produce $UO_3$. The $UO_3$ was divided into two equal portions, one of which was chlorinated with hexachloropropene to form $UCl_4$, and the other of which was dissolved in aqueous hydrochloric acid and evaporated to dryness to produce $UO_2Cl_2.XH_2O$. The uranous and uranyl salts thus obtained were then dissolved in water, each at a concentration of 2% U, to form the exchange solution for the succeeding enrichment stage.

The above procedure was repeated, with respect to the oxalate filtrate, for seven more stages, to make a total of nine enrichment stages, each stage involving a 50% volume reduction.

The uranous oxalate precipitate from the initial stage, as described above, was utilized to prepare the feed for the first of a series of depletion stages (depletion with respect to $U^{235}$). This, again, was accomplished by well known methods, i. e., igniting the oxalate to produce $U_3O_8$, dissolving the $U_3O_8$ in nitric acid, precipitating the uranium from the nitric acid solution with hydrogen peroxide, and calcining the latter precipitate to produce $UO_3$. The $UO_3$ was then divided into two equal parts, one of which was chlorinated with hexachloropropene to produce $UCl_4$, and the other of which was dissolved in aqueous hydrochloric acid and evaporated to dryness to produce $UO_2Cl_2.XH_2O$. The resulting uranous and uranyl salts were then dissolved in water, each at a concentration of 2% U, to form the exchange solution for the succeeding depletion stage.

This procedure was then repeated, with respect to the oxalate precipitate, for eight more stages, to make a total of nine depletion stages, each stage involving a 50% volume reduction.

A summary of the above enrichment runs is given in Table 2, and a summary of the depletion runs in Table 3. In each case initial, intermediate, and final assays for $U^{235}$ are included.

Table 2

ENRICHMENT RUNS

| Stage | Total U in grams | | Total Volume of System (Ml.) | pH | Time of Stand (Min.) | Ml. Conc. HCl Add. at end of Exchange | Oxalic Acid Add. to PPT $U^{+4}$ (g.) | Assay of Samples, Percent $U^{235}$ |
|---|---|---|---|---|---|---|---|---|
| | As $U^{+4}$ | As $UO_2^{+2}$ | | | | | | |
| 0 | | | | | | | | .7052 |
| 1 | 396 | 399 | 40,000 | 1.55 | 60 | 5,000 | 480 | |
| 2 | 198 | 198 | 20,000 | 1.68 | 60 | 2,500 | 239 | |
| 3 | 96 | 96 | 9,600 | 1.53 | 60 | 1,500 | 115 | |
| 4 | 47 | 46 | 4,600 | 1.55 | 60 | 750 | 57 | |
| 5 | 23 | 22.5 | 2,200 | 1.55 | 60 | 375 | 28 | .7072 |
| 6 | 10.8 | 10.8 | 1,080 | 1.56 | 60 | 180 | 13.1 | |
| 7 | 5.5 | 5.2 | 700 | 1.40 | 120 | 125 | 6.7 | |
| 8 | 3.5 | 3.5 | 350 | 1.49 | 90 | 60 | 4.2 | |
| 9 | 1.6 | 1.6 | 160 | 1.52 | 60 | 26 | 2.0 | .7090 |

Table 3
DEPLETION RUNS

| Stage | Total U in grams | | Total Vol. of system, Ml. | pH | Time of Stand (min.) | Ml. Conc. HCl Added | g. Oxalic Acid Added | Assay (ave.), percent $U^{235}$ |
|---|---|---|---|---|---|---|---|---|
| | As $U^{+4}$ | As $UO_2^{+2}$ | | | | | | |
| 0 | | | | | | | | .7054 |
| 1 | 399 | 399 | 20,000 | 1.60 | 75 | 5,000 | 481 | |
| 2 | 164 | 145 | 7,750 | 1.55 | 60 | 1,940 | 198 | |
| 3 | 82 | 54 | 4,000 | 1.53 | 60 | 1,350 | 100 | |
| 4 | 47 | 32 | 1,975 | 1.55 | 70 | 650 | 60 | |
| 5 | 22.4 | 18.4 | 1,018 | 1.51 | 60 | 350 | 30 | .7031 |
| 6 | 12.8 | 10.9 | 593 | 1.55 | 65 | 200 | 16 | |
| 7 | 5.6 | 4.8 | 308 | 1.57 | 70 | 100 | 8 | |
| 8 | 2.7 | 2.4 | 153 | 1.58 | 65 | 50 | 4 | |
| 9 | 1.6 | 1.5 | 78 | 1.51 | 75 | 25 | 2 | .7016 |

A stage separation factor of 1.0012 may be calculated from the assays of either the enrichment runs or the depletion runs of the above example. From this it may be seen that by greatly increasing the number of stages $U^{235}$ may be substantially completely separated from natural uranium by the process of the present invention. Obviously, however, for such a greatly increased number of stages a 50% volume reduction per stage would be very undesirable. This may be avoided by employing a counter-current batch procedure such as hereinbefore referred to and illustrated, as to one stage, in the accompanying flow diagram. After a countercurrent cascade of this type has reached operating equilibrium, the uranyl uranium may be passed stagewise up the cascade, and the uranous uranium stagewise down the cascade without the necessity for a substantial volume change from stage to stage.

It will be apparent that the procedure of Example II may be utilized for the separation of isotopes other than $U^{235}$. For example, natural uranium which has been depleted of $U^{235}$ by the electromagnetic separation process, and subsequently stored for a long period of time, contains substantial quantities of $U^{234}$ in addition to the otherwise substantially pure $U^{238}$. These two isotopes, both of which have recognized utility, obviously can be successfully separated by the enrichment process illustrated in connection with the separation of $U^{235}$.

In general, it may be said that the above examples are merely illustrative and should not be construed as limiting the scope of my invention. Numerous other isotope combinations may be separated, various other exchange reaction conditions may be employed, and many other interstage chemical conversion steps may be utilized, within the scope of the foregoing description. The scope of my invention should be understood to be limited only as indicated by the appended claims.

I claim:

1. A process for effecting isotope exchange between uranyl ions and uranous ions which comprises digesting an aqueous acidic solution of uranyl ions and uranous ions at a pH of 1.0–2.0.

2. A process for effecting isotope exchange between uranyl ions and uranous ions which comprises digesting an aqueous mineral acid solution of uranyl ions and uranous ions at a temperature of 25–75° C. and in the presence of light, while maintaining the pH of said solution between 1.5 and 1.9.

3. A process for effecting isotope exchange between uranyl ions and uranous ions which comprises digesting an aqueous acidic solution of uranyl ions and uranous ions at a pH above 1.0 and below the pH at which polymeric uranous ions are formed in said solution.

4. A process for effecting isotope exchange between uranyl ions and uranous ions which comprises digesting an aqueous acidic solution of uranyl ions and monomeric hydrolyzed uranous ions at a temperature of 25–75° C. and in the presence of light and thereafter separating the uranyl and uranous components of said solution.

5. A process for effecting isotope exchange between uranyl ions and uranous ions which comprises digesting an aqueous hydrochloric acid solution of uranyl ions and monomeric hydrolyzed uranous ions for a period of about one hour at a temperature of 25–75° C. and in the presence of light, and thereafter separating the uranyl and uranous components of said solution.

6. A process for isotopically enriching, with respect to a lighter isotope, uranium initially containing a plurality of isotopes, which comprises forming from said uranium an aqueous acidic solution of uranyl and uranous ions, digesting said solution at a pH of 1.0–2.0, separating the uranyl and uranous components of the digested solution, forming from the separated isotopically enriched uranyl component a fresh aqueous acidic solution of uranyl and uranous ions, and repeating said digesting and separating steps.

7. The process of claim 6 in which the initial plurality of isotopes comprises essentially $U^{235}$ and $U^{238}$.

8. The process of claim 6 in which the initial plurality of isotopes consists essentially of $U^{234}$ and $U^{238}$.

9. A process for isotopically enriching, with respect to a lighter isotope, uranium initially containing a plurality of isotopes, which comprises forming from said uranium an aqueous mineral acid solution about 0.1 molar with respect to uranyl ions and about 0.1 molar with respect to uranous ions, digesting said solution for about one hour at a temperature of 25–75° C. and in the presence of light, while maintaining the pH of said solution between 1.5 and 1.9, separating the uranyl and uranous components of the digested solution, forming from the separated isotopically enriched uranyl component a fresh mineral acid solution of uranyl and uranous ions, and repeating said digesting and separating steps.

10. A process for isotopically enriching and depleting, with respect to a lighter isotope, uranium initially containing a plurality of isotopes, which comprises forming from said uranium an aqueous mineral acid solution of uranyl and monomeric hydrolyzed uranous ions, digesting said solution to effect isotope exchange, separating the uranyl and uranous components of the digested solution, utilizing the separated isotopically enriched uranyl component as the source of uranyl ions for a fresh aqueous mineral acid solution of uranyl ions and monomeric hydrolyzed uranous ions, and repeating said digesting and separating steps; utilizing the separated isotopically depleted uranous component from said first digesting step as the source of uranous ions for a fresh aqueous mineral acid solution of uranyl ions and monomeric hydrolyzed uranous ions, and repeating said digesting and separating steps.

11. The process of claim 10 in which the initial plurality of isotopes comprises essentially $U^{235}$ and $U^{238}$.

12. The process of claim 10 in which the initial plurality of isotopes consists essentially of $U^{234}$ and $U^{238}$.

13. A process for isotopically enriching and depleting, with respect to a lighter isotope, uranium initially containing a plurality of isotopes, which comprises forming from said uranium an aqueous hydrochloric acid solution about 0.1 molar with respect to uranyl ions and about 0.1 molar with respect to uranous ions, digesting said solution for about one hour at a temperature of 25–30° C. in the presence of light while maintaining the pH of said solution between 1.5 and 1.9, separating the uranyl and uranous components of the digested solution, utilizing the separated isotopically enriched uranyl component as the source of uranyl ions for a fresh hydrochloric acid solution of uranyl ions and uranous ions, and repeating said digesting and separating steps; utilizing the separated isotopically depleted uranous component from said first digesting step as the source of uranous ions for a fresh aqueous hydrochloric acid solution of uranyl and uranous ions, and repeating said digesting and separating steps.

14. The process of claim 13 in which the initial plurality of isotopes comprises essentially $U^{235}$ and $U^{238}$.

15. The process of claim 13 in which the initial plurality of isotopes consists essentially of $U^{234}$ and $U^{238}$.

References Cited in the file of this patent

Friend: Textbook of Inorganic Chemistry, vol. VII, part III, p. 288; published in 1926 by Charles Griffin and Co., Ltd., London. (Copy in Scientific Library.)